(12) United States Patent
Boatner, Jr.

(10) Patent No.: US 8,835,808 B2
(45) Date of Patent: Sep. 16, 2014

(54) APPARATUS FOR JOINING SECTIONS OF PIPE

(76) Inventor: John M. Boatner, Jr., Zachary, LA (US)

( * ) Notice: Subject to any disclaimer, the term of this patent is extended or adjusted under 35 U.S.C. 154(b) by 192 days.

(21) Appl. No.: 12/660,510

(22) Filed: Mar. 1, 2010

(65) Prior Publication Data

US 2011/0210112 A1    Sep. 1, 2011

(51) Int. Cl.
| | |
|---|---|
| *B21J 13/08* | (2006.01) |
| *B23K 31/02* | (2006.01) |
| *B23K 9/167* | (2006.01) |
| *B23K 9/028* | (2006.01) |
| *B23K 9/035* | (2006.01) |
| *B23K 37/053* | (2006.01) |

(52) U.S. Cl.
CPC ............. *B23K 31/02* (2013.01); *B23K 9/167* (2013.01); *B23K 9/0286* (2013.01); *B23K 2201/06* (2013.01); *B23K 9/0354* (2013.01); *B23K 37/0531* (2013.01)
USPC ............. 219/158; 219/60 A; 219/61; 219/74

(58) Field of Classification Search
USPC .................. 219/60 A, 61, 74, 158
See application file for complete search history.

(56) References Cited

U.S. PATENT DOCUMENTS

| | | | | | |
|---|---|---|---|---|---|
| 4,415,114 | A | * | 11/1983 | Hallenbeck | 228/57 |
| 4,916,281 | A | * | 4/1990 | Flasche et al. | 219/61 |
| 5,066,208 | A | * | 11/1991 | Warmerdam | 425/13 |
| 5,100,043 | A | * | 3/1992 | Hallenbeck | 228/42 |
| 5,187,343 | A | * | 2/1993 | Edwards | 219/74 |
| 5,484,973 | A | * | 1/1996 | Gittens et al. | 219/74 |
| 5,669,547 | A | * | 9/1997 | Spring | 228/219 |
| 6,395,127 | B1 | * | 5/2002 | Johnson et al. | 156/304.2 |

FOREIGN PATENT DOCUMENTS

GB    2267545 A    * 12/1993

* cited by examiner

*Primary Examiner* — Andy Huynh
(74) *Attorney, Agent, or Firm* — Michael J. Vallan

(57) ABSTRACT

The present invention relates to a method and apparatus to be used when welding two abutting sections of pipe or tubing, and also to purge blocks for establishing a localized inert atmosphere inside two abutting pipe sections in the region of a desired weld joint. The present invention comprises an inflatable bladder with elongated engaging members that can be removable positioned within the ends of two abutting pipe sections in order to center the two abutting sections of pipe and create the purge block.

5 Claims, 4 Drawing Sheets

APPARATUS FOR JOINING SECTIONS OF PIPE

CROSS-REFERENCE TO RELATED APPLICATIONS

Not applicable

FEDERALLY SPONSORED RESEARCH

Not applicable

SEQUENCE LISTING OR PROGRAM

Not applicable

FIELD OF INVENTION

The present invention relates to a method and apparatus for joining sections of pipe. More specifically, this invention relates to a method and device used to secure, position, and join sections of pipe through purge block welding.

BACKGROUND OF INVENTION

The present invention relates to a method and apparatus to be used when welding two abutting sections of pipe or tubing, and also to purge blocks for establishing a localized inert atmosphere inside two abutting pipe sections in the region of a desired weld joint.

Modern plants for the processing, refinement, and production of oil, petrochemicals, natural gases and other like materials often take place in a manufacturing facility that employs the use of a network of piping. The piping network is a significant component of the facility. To produce this network, a great many sections of piping or tubing are assembled. This assembly is commonly carried out by welding sections of pipe or tubing to each other, to pipe fittings, and to other components of the network.

Due to the nature of the materials oftentimes being transported through this network of piping, the purity of the welds and the possibility of corrosion sites are concerns that must be addressed. Weld sites are often known to be corrosion sensitive points. Therefore, consistency and efficiency in conducting welds is an extremely important concern in establishing the network of piping referenced above.

A generally well known method of joining two abutting pieces of pipe or tubing in light of these concerns is tungsten inert gas (TIG) welding. In TIG welding to goal is to establish an inert atmosphere inside two abutting pipe or tubing sections in the region of the desired weld, as well as an inert atmosphere on the outside of the pipe sections in the region of the desired weld joint.

The general practice in this form of welding has been to fill both pipes or tubing sections, which can be very long, with a protective gas such as argon. Typically, a continuous flow of argon gas is provided throughout the welding operation in order to establish the inert atmosphere near the region of the desired weld. A result of this practice is the consumption of large amounts of argon gas, which in turn causes high costs. Further, this general practice does not address the need and concern for centering the two adjoining pipe sections and keeping them stationary through the welding process. Pipe ends must be centered and aligned in order to effect a good weld and seal. Normally, separate mechanical devices have been used to align and center the pipes.

A known alternative to the above-referenced technique involved the use of purge blocks, dams or plugs, which establish a localized inert atmosphere at the interior surface of a desired weld joint. The basic premise to this particular technique has been to plug both ends of the pipes or tubes to be joined. Embodiments of the plugs have included both separate and interconnected inflatable plugs or seals. Notwithstanding, the use of these prior art plugs have failed to account for the alignment of two abutting sections of pipe or tubing, including the centering of pipe ends and keeping them stationary.

The present invention departs from prior art techniques by presenting a new pipe joining method and apparatus that employs an inflatable bladder that both creates a purge block and further positions and centers two abutting sections of pipe or tubing for use in conventional TIG welding.

SUMMARY OF THE INVENTION

The present invention provides a method and apparatus for an improved purge block for use in establishing a localized inert atmosphere inside two abutting pipe sections in the region of a desired weld, as well positioning, aligning, and centering the two abutting pipe sections sought to be joined.

The present invention comprises an inflatable bladder that can be removable positioned within the ends of two abutting pipe sections. The inflatable bladder is comprised of suitable flexible fireproof elastomeric material and a plurality of engaging members.

In one embodiment, the inflatable bladder comprises three sections, a rearward balloon-type portion having a passageway therethrough to allow for the introduction of inert gas, a thicker middle portion having a plurality of apertures circumferentially displaced around the middle portion, and a forward balloon-type portion. The middle portion of inflatable bladder is comprised of a plurality of elongated engaging members securely attached and circumferentially displaced about the middle portion of the inflatable bladder. Each elongated engaging member may be further equipped with spacing teeth securely attached to each elongated engaging member.

In operation, the inflatable bladder is manually inserted inside two abutting pipe sections, with the spacing teeth serving as a spacing guide between the two abutting pipe section ends. Inert gas is then introduced into the inflatable bladder via the passageway of the rearward balloon-type portion, thereby causing the bladder to inflate, which in turns causes the elongated engaging member to engage with the inside walls of the two abutting pipe sections. As a result, the two abutting pipe sections are aligned, centered, and locked into position.

Inert gas is continued to be introduced into the inflatable bladder which causes the rearward balloon-type portion and forward balloon-type portion of the inflatable bladder to inflate and create a purge block with a defined chamber having the inside walls of the two abutting pipe sections forming a sidewall and the rearward balloon-type portion and forward balloon-type portion each as an endwall. A constant flow of inert gas is introduced into the defined chamber via the plurality of apertures circumferentially displaced around the middle portion of the inflatable bladder Joining of the two sections of pipe may then be accomplished via normal TIG welding procedures. Flow in inert gas is then discontinued allowing the bladder to deflate and the elongated engaging members to disengage. The inflatable bladder may then be manually removed.

DRAWINGS—REFERENCE NUMERALS

Figure 1:
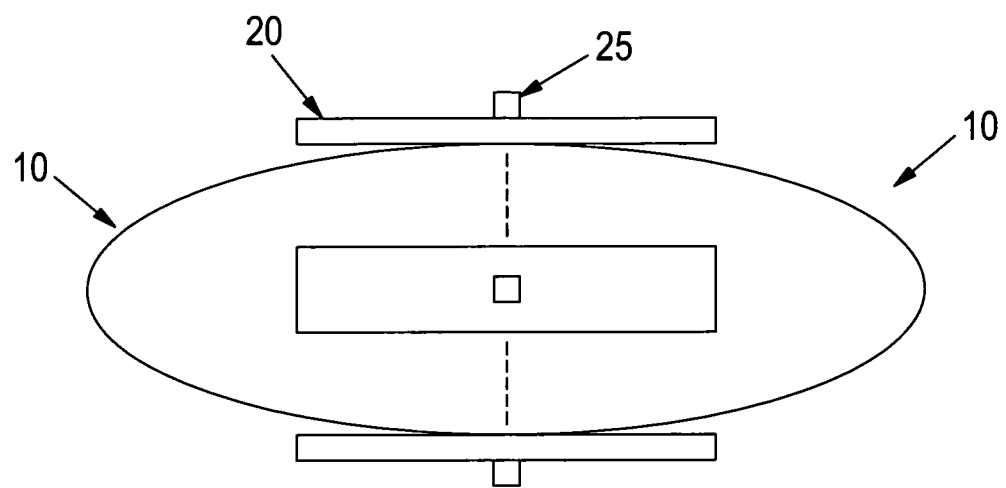
FIG. 1 is a side view of the bladder.

10 Bladder
15 Forward balloon-type portion
16 Rearward balloon-type portion
17 Middle portion
20 Elongated engaging member
25 Spacing teeth
30 Aperture
35,36 Pipe
40 Pipe inside wall
50 Opening
55 Means for introducing inert gas

DETAILED DESCRIPTION OF THE INVENTION

Figure 2:
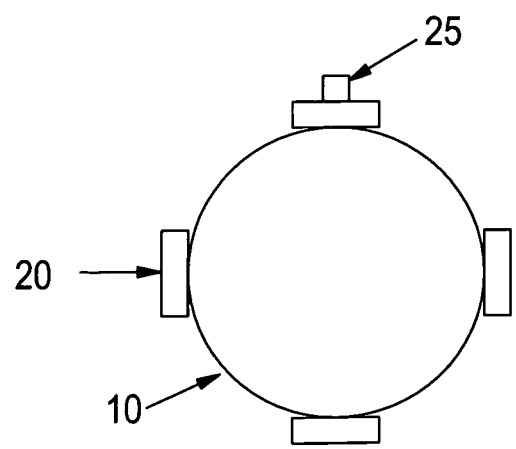
FIG. 2 is a longitudinal cross-sectional view of the bladder.
Figure 3:
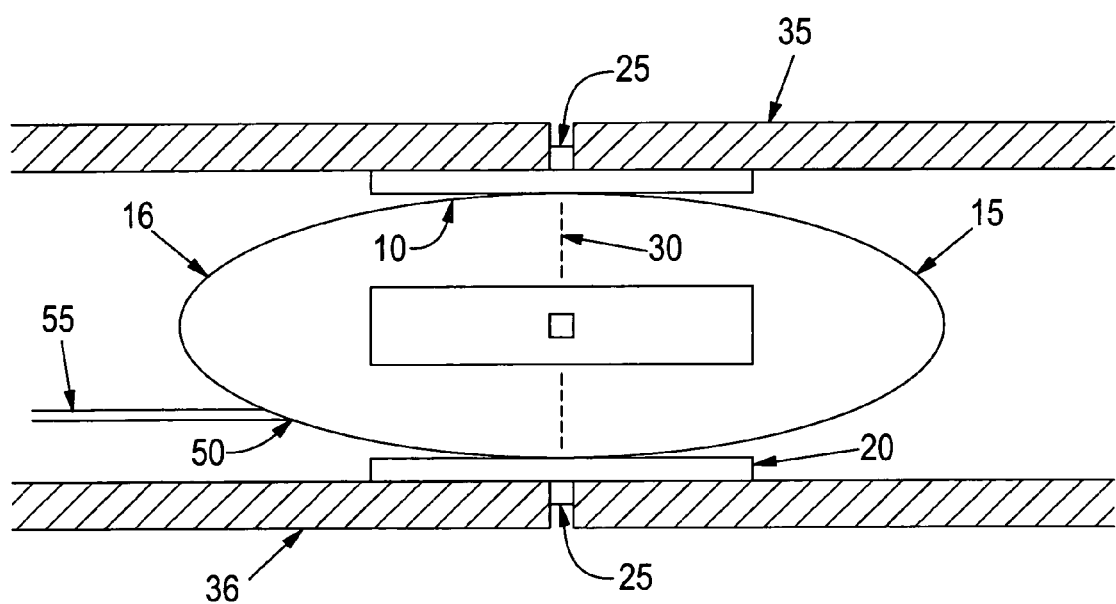
FIG. 3 is a side view of the bladder positioned within the ends of two abutting pipe sections.
Figure 4:
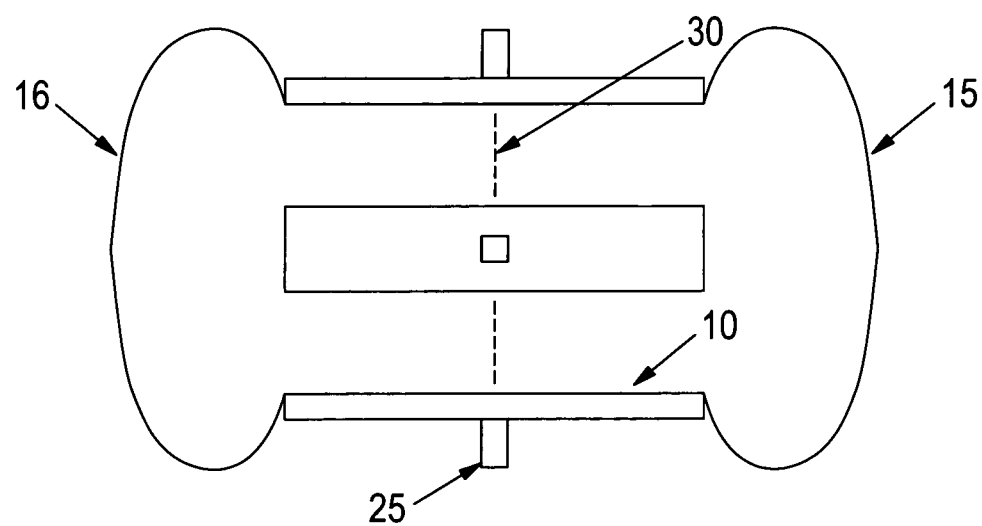
FIG. 4 is a side view of an inflated bladder.

Referring to FIGS. 1 and 2, one embodiment of the claimed invention is shown. The claimed invention comprises an inflatable bladder 10. The bladder 10 is comprised of a fireproof elastomeric material and elongated engaging members 20. The bladder 10 further comprises three portions, a rearward balloon-type portion 16, a thicker middle portion 17, and a forward balloon-type portion 15. Circumferentially disposed about the middle portion 17 is a plurality of elongated engaging members 20. Each elongated engaging member 20 is securely attached to the middle portion 17 and is equipped with a spacing tooth 25 securely attached thereto. FIG. 3 is a second embodiment of the claimed invention. In this embodiment, the bladder 10 is shown positioned within the ends of two abutting sections of pipe 35, 36. The rearward balloon-type portion 16 is equipped with a passageway 50 to allow for a means 55 of introduction of inert gas into the bladder 10.

Figure 5:
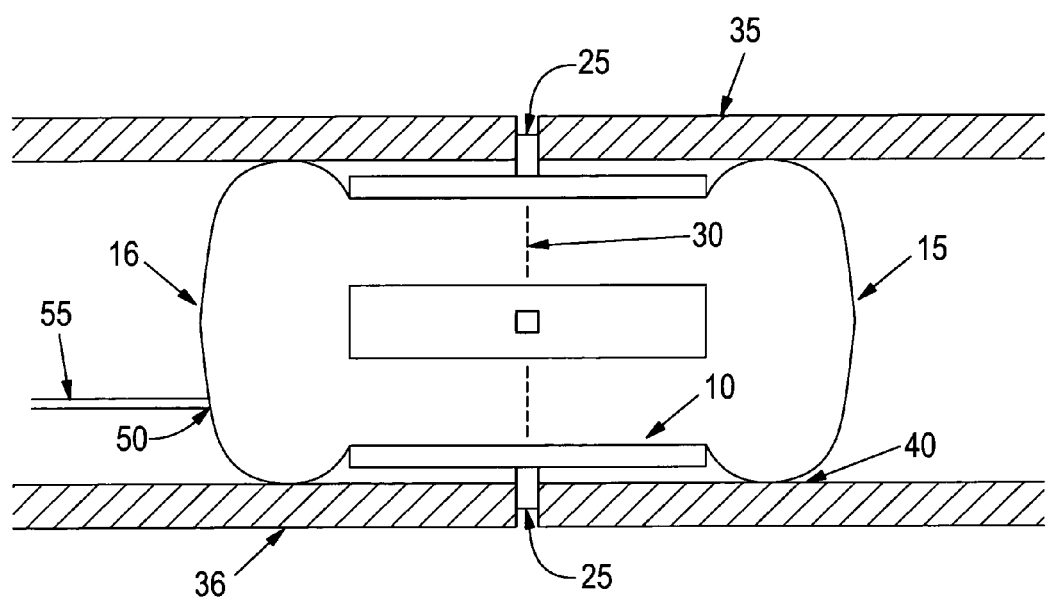
FIG. 5 is a side view of an inflated bladder positioned within the ends of two abutting pipe sections.

In operation, the bladder 10 is manually positioned inside and between the ends of two abutting sections of pipe 35, 36. As shown in FIG. 3, each spacing tooth 25 serves as a guide in spacing the ends of the two abutting sections of pipe 35,36 the appropriate distance to allow for optimal TIG welding. Next, inert gas is introduced to the bladder 10 via the passageway 50, causing the bladder 10 to inflate. FIG. 5 shows the inflated bladder 10. As the bladder 10 inflates, the elongated engaging members 20 engage and grip the internal walls 40 of each abutting sections of pipe 35, 36. As a result, the two sections of pipe 35,36 are aligned, centered, and locked into place without any additional measuring or manipulation.

Inert gas is continued to be introduced into the bladder 10, thereby causing the rearward balloon-type portion 16 and forward balloon-type portion 15 to inflate, thereby creating a purge block. Simultaneously, inert gas is introduced into the purge block via the plurality of apertures 30 disposed about the middle portion 17 of the bladder. Next, the two sections of pipe 35,36 may be welded by conventional TIG welding methods. Once welding is complete, the introduction of inert gas is discontinued, thereby causing the bladder 10 to deflate and the elongated engaging members 20 to disengage. The bladder 10 may then be removed manually.

I claim:
1. A pipe joining apparatus comprising:
   a. An inflatable bladder; wherein said inflatable bladder further comprises a rearward balloon type portion, a forward balloon type portion, and a middle portion, said middle portion containing at least one aperture, and a means for introduction an inert gas into said inflatable bladder, and
   b. At least one elongated engaging member securely attached to the middle balloon portion of said inflatable bladder and circumferentially displaced about said inflatable bladder such that said elongated engaging member engages the inside wall of a pipe, said elongated engaging member further comprising at least one spacing tooth securely attached thereto.
2. A pipe joining apparatus comprising:
   a. An inflatable bladder containing a rearward balloon type portion, a forward balloon type portion, and a middle portion, said middle portion containing at least one aperture;
   b. At least one elongated engaging member securely attached to said inflatable bladder;
   c. At least one spacing tooth securely attached to said elongated engaging member; and
   d. A means for introducing inert gas into said inflatable bladder.
3. The pipe joining apparatus of claim 2, wherein said elongated engaging member is securely attached to the middle portion of said inflatable bladder.
4. The pipe apparatus of claim 3, wherein said inflatable bladder further comprises a high temperature resistant material.
5. A method of joining sections of pipe, comprising:
   a. Positioning an inflatable bladder containing a rearward balloon type portion, a forward balloon type portion, and a middle portion, said middle portion containing at least one aperture, and at least one elongated engaging member securely attached to said middle portion; and at least one spacing teeth securely attached to said elongated engaging member; and a means for introducing inert gas into said inflatable bladder, between the ends of two abutting sections of pipe;
   b. Introducing an inert gas into said inflatable bladder via said means for introducing inert gas;
   c. Tack welding and closure welding of said ends of two abutting sections of pipe;
   d. Terminating the introduction of inert gas into said inflatable bladder; and
   e. Removing said inflatable bladder.

* * * * *